United States Patent [19]

Stamerjohn et al.

[11] Patent Number: 4,472,246
[45] Date of Patent: Sep. 18, 1984

[54] PROCESS FOR RECOVERY OF AMINE FROM SPENT ACID STRIPPING LIQUOR

[75] Inventors: David M. Stamerjohn; Richard V. Norton, both of Columbus; Gregory P. Sturtz, Worthington, all of Ohio

[73] Assignee: Ashland Oil, Inc., Ashland, Ky.

[21] Appl. No.: 409,905

[22] Filed: Aug. 20, 1982

[51] Int. Cl.³ .............................................. B01D 3/34
[52] U.S. Cl. ...................................... 203/37; 203/75; 203/77; 203/78; 203/80; 203/82; 203/84; 203/94; 203/98; 564/499
[58] Field of Search ................. 564/497, 499; 203/36, 203/37, 71, 73, 75, 77, 78, 80, 81, 82, 84, 91, 94, 98

[56] References Cited

U.S. PATENT DOCUMENTS 3,536,533 10/1970 Hurley et al. ................... 564/497

Primary Examiner—Frank Sever
Attorney, Agent, or Firm—Mueller and Smith

[57] ABSTRACT

Disclosed is a process for recovering a virtually water-free amine from an amine acid salt thereof. The process comprises a unique combination of phase separation stages practiced under mild heating and distillation stages. An amine product containing less than 0.2% water can be achieved by the present process. The feedstock for the process suitably is an acid scrub liquor used to scrub amine from a vapor stream thereof which has been used in a cold-box molding process in the foundry industry or in the cure of vapor permeation curable coatings in the coatings industry.

5 Claims, 3 Drawing Figures

PROCESS FOR RECOVERY OF AMINE FROM SPENT ACID STRIPPING LIQUOR

BACKGROUND OF THE INVENTION

The present invention relates to the recovery of amine from amine-containing spent acid stripping liquor for obtaining an aqueous liquor effluent that meets economically today's stringent quality standards and for recovering amine therefrom for reuse in a variety of chemical processes.

Vaporous amines can be scrubbed from vaporous or gaseous streams bearing same by several techniques including, for example, adsorption by a solid adsorbent, scrubbing by an acid scrub liquor, or similar techniques. Such vaporous amine effluents can arise from a variety of commercially practiced chemical operations, such as, for example, cold-box foundry core and mold production and vapor permeation curable coatings. Cold-box foundry core and mold production involves the admixture of a binder with sand or similar foundry mold particulate aggregate which is molded into a desired shape followed by its exposure to a vaporous amine gas stream. Such foundry binder cold-box technology can be found in, for example, U.S. Pat. Nos. 3,409,579; 3,429,848; 3,485,797; 3,676,392; 3,933,727; and 4,179,427. Vapor permeation curable coatings involves the application of a coating composition comprising an aromatic-functional polymer, a polyisocyanate, optionally dispersed in a solvent therefor, which coating composition is exposed to a vaporous tertiary amine to achieve rapid, room temperature cure of such coating. Exemplary vapor permeation curable compositions and processes can be found in U.S. Pat. Nos. 3,789,044; 3,822,226; 3,836,491; and 4,331,782 and British Pat. Nos. 1,369,351 and 1,351,881.

The gaseous amine-containing stream vented from the foundry core box or from the vapor permeation cure chamber bears amine therein which poses an environmental disposal problem. Stringent quality standards require the amine to be removed from such vapor stream prior to its being vented to the atmosphere. While solid adsorbent techniques could be employed, current foundry thinking involves the use of acid scrubbing liquors through which the spent amine gas is passed or bubbled. The acid in the scrub liquor reacts with the amine to form the corresponding amine acid salt and leaves the carrier gas stream of suitable quality for its venting to the atmosphere. Such carrier streams can be air, carbon dioxide, nitrogen, or similar conventional carrier gas. The stripping liquor, however, presents its own disposal problems. Heretofore, such spent stripping liquor has been sent to environmentally-approved waste disposal sites or stored in drums or tanks at the plant site while disposition thereof is decided.

The spent stripping liquor involves not only a waste disposal problem but also represents a loss of valuable amine. The present invention is directed to a simple and economical process for recovering the amine from such spent stripping liquors in a form suitable for reuse, eg. by the foundry industry or by the vapor permeation curable coating industry.

Broad Statement of the Invention

Broadly, the present invention is a process for recovering a virtually waterfree amine from an amine acid salt thereof. This broad process for an amine that forms an azeotrope with water comprises: (a) passing said amine acid salt in a liquid stream and a base into a distillation pot fitted with an overhead first distillation column, the proportion of base being adequate to liberate essentially all of said amine from its acid salt, said distillation pot being held at a temperature and pressure sufficient for an amine phase to be volatilized from said pot and into said overhead distillation column, said distillation column containing an adequate number of theoretical stages so that the overhead distillate is significantly depleted in water content; (b) withdrawing an overhead amine-containing stream from said distillation column and at least partially condensing said stream; (c) passing said at least partially condensed amine stream into a separation zone and permitting said stream to separate into a lower aqueous phase and an upper amine-rich phase; (c) withdrawing said upper amine-rich phase from said separation zone and passing same as distilland into a second distillation column at a point intermediate between an upper distillate outlet and a lower tenate (or residue) outlet, said second distillation column containing an adequate number of stages and being held under conditions such that a virtually water-free amine product is withdrawn from an intermediate product outlet and an amine/water azeotrope effluent is withdrawn from said distillate outlet.

A preferred process for recovering virtually water-free amines which have a boiling point significantly less than that of water and which do not form an azeotrope with water needs only to be subjected to the primary neutralization/distillation step of the foregoing process as the second distillation column is unnecessary. An especially preferred embodiment for recovering an amine which forms an azeotrope with water comprises mixing the base with the amine acid salt in a mixing zone containing aqueous solvent in a proportion of base adequate to liberate essentially all of the amine from its acid salt; mildly heating the aqueous mixture in a separation zone and permitting the mixture to separate into a lower aqueous phase and an upper amine-rich phase; withdrawing the amine-rich phase from said separation zone and passing same as distilland into a distillation column at a point intermediate between an upper distillate outlet and a lower tenate outlet, the distillation column containing an adequate number of stages and being held under conditions such that a virtually water-free amine product is withdrawn at a product outlet intermediate said upper distillate outlet and said lower tenate outlet, a minor proportion of virtually water-free amine is withdrawn from said tenate outlet, and an amine-water azeotrope distillate is withdrawn from said upper distillate outlet, at least partially condensed, and at least a fraction of said condensate recycled to said distillation column. Preferably, this at least partially condensed azeotrope is thereafter mildly heated and subject to phase separation so that the amine-rich layer only is recycled to the distillation column and the water layer is available for disposal or recycling to an earlier step of the process where appropriate.

Advantages of the present invention include the efficient conversion of an acidic effluent into a form safe for environmental disposal. Another advantage is the recovery of a useful water-depleted amine product which can be reused in chemical processes including cold-box foundry core manufacture and vapor permeation cutable coatings processes. A further advantage is the design of an amine recovery process which is especially energy efficient and which minimizes capital investment in equipment. Yet another advantage is the implementation of processes having flexibility for handling a variety of different amines. These and other advantages readily will become apparent from the description of the invention contained herein.

Figure 1:
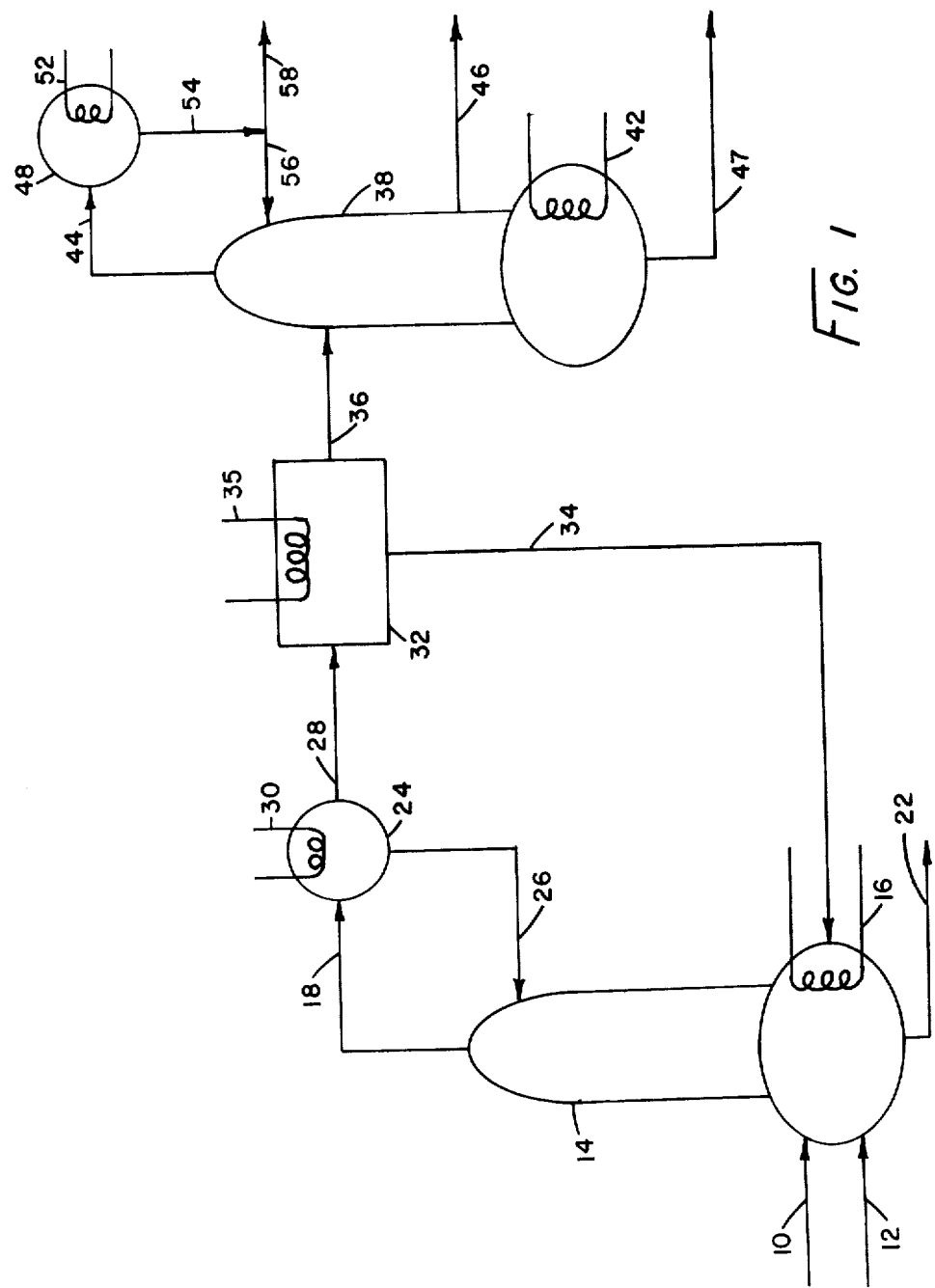
FIG. 1 is a flow diagram showing how the invention can be practiced for the recovery of a virtually water-free amine from an amine acid salt thereof.

The drawings will be described in detail in the description of the invention which follows. Valves, fittings, instrumentation, controls, pumps, compressors, gas collectors, surge tanks, holding basins, stand-by equipment and many by-passes are not shown, but are to be installed in conventional manner where necessary, desirable, or convenient. Materials of construction for the process are conventional. Thus, corrosion-resistant materials such as austentic stainless steel, plastic, glass-lined steel, wood, or even clay can be used where necessary. Concrete and steel can be used where corrosion or erosion is inconsequential. Also, various of the tanks and lines illustrated can be in multiple, series, cascade, or parallel connected, for additional treating time or capacity.

Detailed Description of the Invention

Tertiary amine vapor is used in foundry applications when long worktimes are desired and essentially instantaneous curing times are desired. Suitable vaporous tertiary amine catalysts for such purpose include, for example, triethyl amine, dimethyl isopropyl amine, dimethyl ethyl amine, cyclohexyl dimethyl amine, methyl diethyl amine, trimethyl amine, and the like. In vapor permeation curable coatings applications, these same tertiary amines find utility for curing coatings by exposure to such vaporous or gaseous tertiary amines. It should be noted that triethyl amine and dimethyl ethyl amine dominate the foundry industry and the VPC industry. Accordingly, any amine recovery process which is to be useful to these industries must address itself to the successful recovery of triethyl amine and dimethyl ethyl amine. As alluded to above, a variety of techniques for scrubbing such vaporous or gaseous amines have been employed and could be employed. One technique which finds favor in the foundry industry is the use of aqueous acid liquors through which the spent amine stream is passed. The acid liquors typically are somewhat dilute in concentration and react with the amine to form the corresponding amine acid salt. Sulfuric and phosphoric acids predominate in use, though virtually any organic or inorganic acid could be used as is necessary, desirable, or convenient. Typically, the scrubbing liquor is employed to scrub the amine for a time sufficient until the acid content has been substantially depleted. At this juncture in time, the liquor conventionally has been hauled away for disposal, incinerated, or otherwise disposed.

Another technique for scrubbing the amine-ladden gas stream involves the contact of such stream with a particulate, solid adsorbent such as, for example, carbon, porous metal oxide beads, and the like. Such particulate adsorbent can be treated with acid to enhance the activity of the adsorbent for removal of the amine from the gas stream passed therethrough. In fact, a conventional acidic ion-exchange resin suitably can be used for scrubbing the amine from the spent amine gas stream passed therethrough. Recovery of the amine from the spent adsorbent can be practiced by washing the solid adsorbent with a cold aqueous base to liberate the amine. Decantation, filtration, or similar technique is employed for separating the adsorbent from the wash liquor. The adsorbent can be re-acidified for recycle. The cold wash liquor is suitable for admission of the process of the present invention, but desirably will be mildly heated to about 40°–90° C. (or higher if superatmospheric pressure is applied) for enhancement of phase separation of an upper amine-rich layer from a lower aqueous amine-depleted layer. More on this separation technique will be given below. Regardless of the technique employed, a typical amine acid salt concentration from present-day foundry scrubbers is about 40% by weight, though such percentage can vary greatly.

The base used to liberate the amine from its amine acid salt can be a solid or liquid base and such base can be advantageously an alkali metal or alkaline earth metal hydroxide, oxide, or carbonate for economy. Broadly, though, virtually any organic and/or inorganic base could be used for the liberation of the amine in conventional fashion.

Without limiting the present invention, the drawings will be described in detail in particular reference to the recovery of triethyl amine or dimethyl ethyl amine which has been scrubbed by use of an aqueous sulfuric acid liquor. The base will be described in particular reference to sodium hydroxide, preferably provided in aqueous form. It should be recognized that the description with particular reference to these specific reactants is by way of illustration and not limitation on the present invention.

Referring to FIG. 1, the process depicted works effectively and efficiently on amines of varying boiling points and virtually independent of amines which form aqueous azeotropes. The amine feed, typically in aqueous form is passed through line 10 along with a flow of base through line 12 into the distillation pot or reboiler section of distillation column 14. Such distillation pot or reboiler is advantageously heated by steam coil 16, though other forms of direct or indirect heating can be employed as is necessary, desirable, or convenient. The temperature and pressure within distillation column 14, and the type of packing and number of theoretical stages, and the reflux ratio therein, are adequate to provide a separation of water from amine. Amines which form an azeotrope with water will have a significant proportion of water, eg. up to about 10%, in distillate stream 18 withdrawn from column 14. The major proportion of water and by-product salt formed in the still pot of column 14 will be withdrawn from the still pot through outlet 22. Overhead distillate stream 18 then is passed into heat exchanger 24 which is cooled by cooling means 30 and wherein the distillate is at least partially condensed. Depending upon the operating conditions of distillation column 14 and the particular type of amine being recovered, a portion of such condensed distillate from heat exchanger 24 may be recycled back to column 14 via line 26 to establish a reflux to column 14. The reflux ratio set via such stream is a matter of engineering design by those skilled in this art field.

The at least partially condensed overhead amine distillate is withdrawn from heat exchanger 24 via line 28. For amines which do not form aqueous azeotropes and which have a boiling point significantly less than that of water, eg. dimethyl ethyl amine, the overhead at least partially condensed distillate 28 is the product amine stream which is virtually water-free. By virtually water-free is meant that the amine product contains less than 1% water, advantageously less than 0.5% water and preferably less than about 0.2% water. Accordingly, for such an amine, no further processing according to the precepts of the present invention is necessary.

For amines with boiling points less than that of water and which form an azeotrope with water, the stream in line 28 is passed into separation zone 32 which permits the stream to settle into two phases, the lower phase consisting of water containing only trace amounts of amine and an upper amine-rich phase which is substantially depleted of water, eg. about 1-3% water by weight. Separation zone 32 is mildly heated by steam coil 35 or other heating means to a temperature ranging from between about 40° and 90° C. at one atmosphere total pressure (or a higher temperature if superatmospheric pressure is applied) in order to facilitate the amine/water separation as the mutual solubilities of these compounds decreases with increasing temperatures. The lower aqueous phase can be recycled to distillation column 14 via line 34 or can be withdrawn from the system as is necessary, desirable or convenient. The upper amine-rich phase is withdrawn from separator 32 via line 36 and passed into an intermediate-feed distillation column 38. The reboiler or still pot section of column 38 is heated by heat means 42 which can be a steam line or other conventional heat source operating in direct or indirect fashion. Column 38, like column 14, is maintained under conditions of a temperature, pressure, reflux ratio and contains a sufficient number of theoretical plates such that product stream 46 withdrawn as an intermediate distillate is a virtually water-free product. A minor proportion of product amine also is withdrawn from the reboiler section of distillation column 38 through line 47. Overhead azeotrope distillate 44 is passed into heat exchanger 48 which can be cooled indirectly or directly by heat exchange means 52. At least partially condensed azeotrope stream 54 withdrawn from heat exchanger 48 can be recycled to column 38 by line 56 in order to establish a suitable reflux ratio or can be recycled through line 58 to separation zone 32.

Figure 2:
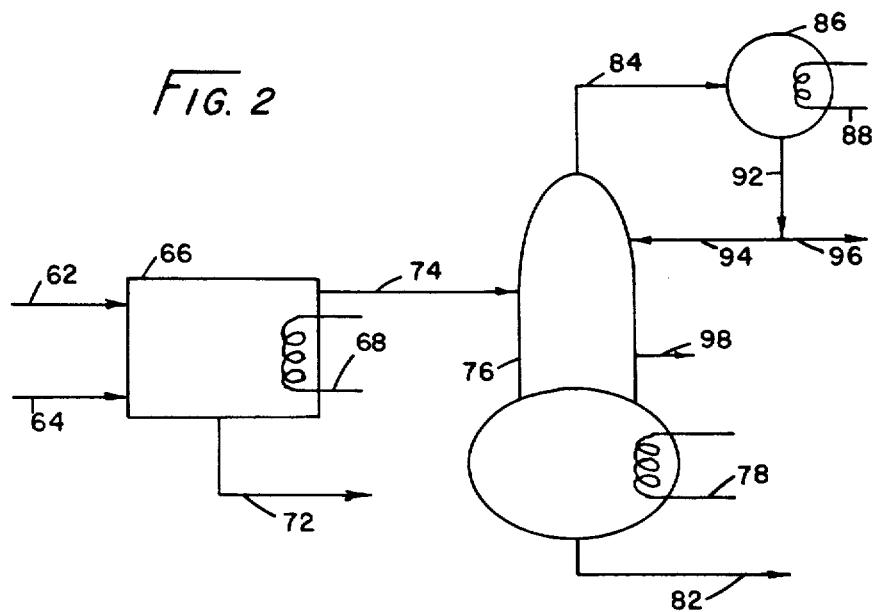
FIG. 2 shows a flow diagram of a preferred embodiment of the invention for recovering of a virtually water-free amine from an amine acid salt thereof.

While the double distillation process with intermediate phase separation procedure described in connection with FIG. 1 can be used for processing a waste stream containing an amine which forms an azeotrope with water, the embodiment of the invention described in FIG. 2 is a simplified procedure preferred for such azeotroping amines. Referring to FIG. 2, amine feed 62 along with a flow of base 64 is passed into separation/neutralization zone 66 wherein the amine salt is essentially entirely liberated. In order to improve the separation of the upper amine phase from the lower water phase, heating means 68 desirably mildly heats zone 66 to a temperature of between about 40° and 90° C. because, for example, triethyl amine becomes increasingly less soluble in water with increasing temperatures. Upon phase separation, the lower aqueous phase containing by-product salt is withdrawn from zone 66 via line 72 while the amine-rich upper phase is withdrawn from zone 66 through line 74. The amine-rich phase in line 74 is passed into center-feed distillation column 76 which has a reboiler section heated by heating means 78. Overhead distillate amine azeotrope is withdrawn from column 76 in line 84 and passed into heat exchanger 86 which is cooled by cooling means 88. The at least partially condensed amine is withdrawn from heat exchanger 86 through line 92 and at least a portion of such amine can be recycled to column 76 through line 94 to establish an a proper reflux ratio. Overflow cooled azeotrope distillate is withdrawn from the system through line 96 and can be recycled to neutralization/separation zone 66. Product amine virtually free of water is withdrawn from column 76 through product outlet line 98 at an intermediate point in the column. Tenate stream 82 from the reboiler of column 76 is a minor stream of product amine also.

Figure 3:
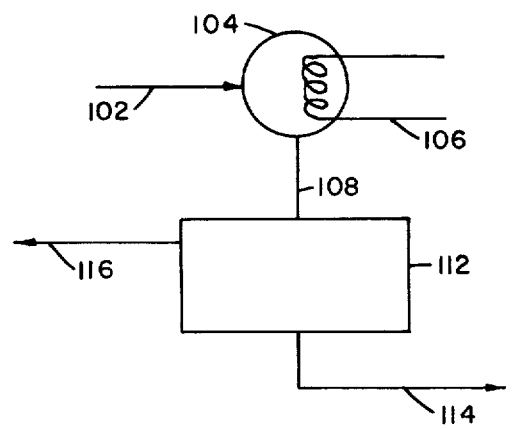
FIG. 3 is a flow diagram of a preferred partial condensation/separation circuit for treating the overhead distillate from the distillation columns shown in the other figures.

This preferred process described in FIG. 2 can take an azeotroping amine feed containing about 40% amine and by the initial phase separation step of the process provide an intermediate amine product in line 74 containing less than about 10% water, the equilibrium proportion of water in the azeotrope. Distillation column 76 then takes the azeotrope composition and completes the separation and recovery of the product amine. In connection with both the process described in FIG. 1 and in FIG. 2, the condensation steps of the processes following distillation can be replaced by a condensation/separation procedure shown in FIG. 3. Referring to FIG. 3, the amine distillate from the distillation column 14, 38, or 76, is fed via line 102 into heat exchanger 104 which is cooled by cooling means 106. The at least partially condensed amine stream is withdrawn from heat exchanger 104 by line 108 and passed into separation zone 112. From separation zone 112 is withdrawn by-product water stream 114 and an amine stream 116. Amine stream 116 can be recycled to the distillation column in part to establish a reflux or can be the product amine withdrawn from distillation column 38 (referring to FIG. 1). This condensation/separation procedure described in FIG. 2 can be advantageous in that the reflux would be depleted in water by the separation step performed therein.

The present invention has been described with particular reference to amines which have boiling points less than that of water. For amines with boiling points higher than that of water, some modification of the process will be necessary. For example, in FIG. 1, stream 22 would be an amine salt stream which could be sent to separation zone 32 for separation of the salt from the amine. For column 38, the amine product stream and azeotrope stream may be reversed depending upon the relative boiling points of such streams. These and other modifications can be implemented by those skilled artisans based on the disclosure contained herein.

Regardless of the technique employed by one of the embodiments of the invention, the product amine withdrawn from the process can contain less than about 0.2% water so that such amine can be useful for return to the foundry industry for producing cold-box foundry molding or to the coatings industry for use in vapor permeation curable coatings processes.

The following example shows how the present invention has been practiced but should not be construed as limiting. In this application, all percentages and proportions are by weight and all units are in the metric system unless otherwise expressly indicated.

EXAMPLE

A pilot plant scale run of the invention as depicted in FIG. 2 was conducted for the recovery of dimethyl ethyl amine (DMEA). The spent and scrubbing liquor analyzed 38.19 wt. % DMEA, 16.4% water, a Stokes viscosity of 0.70, a pH of 2.17, and a free acid content by titration of 15.8 wt. %. The composition of the liquor was estimated at 63.8% DMEA sulfate, 15.8% sulfuric acid, and 16.4% water. Referring to FIG. 1, the column (14) was about 2.7 m (9 feet) in height with a 15.24 cm (6 inch) inside diameter and packed with GOODLOE packing (wire mesh packing supplied by Glitsch, Inc., Dallas, Tex.).

The reboiler was maintained at about 85°–95° C. by injection of steam (16). The base (12) was 49.3 wt. % NaOH. Cooling water (30) was used in the overhead condenser (24) and the reflux ratio (via line 26) was established at 3:1. The scrub liquor was fed into the reboiler at a rate of about 0.675 kg/min (1.5 lb./min.) for a total of about 178.2 kg (396 lb.) and the caustic was fed at a rate of about 0.495 kg/min. (1.1 lb./min) for a total of about 117 kg (260 lb.) At start-up the reboiler was charged with 85.5 kg (190 lb.) of caustic. About 57 l (15 gal.) of sodium sulfate water was withdrawn from the reboiler about every 2 hours.

The temperature in the column about one theoretical plate below the distillate outlet was maintained at less than 40° C. At above 40° C., excess water rises in the column, and the feed must be shut-off and full reflux established until the temperature probe indicates less than 40° C. Flooding of the column also must be avoided in order to produce an amine containing less than the desired specification of water, viz 0.2%. Flooding occurred at excessively high feed rates. A reboiler temperature of 80°–95° C. was found preferable. The feed rate is dependent upon the column size.

The process was operated to recover 67.05 kg (149 lb.) of DMEA product analyzing at 0.103% water. Approximately 99.2% of the DMEA in the feed liquor was recovered.

We claim:

1. A process for recovering a virtually water-free product-grade amine from an amine acid salt thereof contained in a spent acid stripping liquor, said amine having a boiling point significantly less than that of water and not forming an azeotrope with water, which comprises:
   (a) passing said amine acid salt-containing spent acid stripping liquor and a base into a distillation pot fitted with an overhead distillation column, the proportion of base being adequate to liberate essentially all of said amine from its acid salt, said distillation pot being held at a temperature and a pressure sufficient for said amine to be volatilized from said pot and into said overhead distillation column, said distillation column containing an adequate number of theoretical stages an being maintained under conditions so that the overhead distillate therefrom is virtually water-free;
   (b) withdrawing an overhead distillate product which is virtually water-free product-grade amine; and
   (c) withdrawing by-product salt and water from said distillation pot.

2. The process of claim 1 wherein said amine is dimethyl ethyl amine.

3. The process of claim 1 wherein the temperature within said distillation column at a point located about one theoretical plate below the outlet for said overhead distillate product does not exceed about 40° C.

4. The process of claim 1 wherein the proportion of amine acid salt in said spent acid stripping liquor and the proportion of said base passed into said distillation pot are such that flooding of the column is precluded.

5. The process of claim 1 wherein said virtually water-free amine overhead distillate product contains less than 1% water by weight.

* * * * *